(12) United States Patent
Friedman et al.

(10) Patent No.: US 9,110,457 B2
(45) Date of Patent: Aug. 18, 2015

(54) METHODS, SYSTEMS, AND APPARATUS FOR CALIBRATION OF A POSITIONAL OFFSET BETWEEN AN END EFFECTOR AND A POSITION SENSOR

(75) Inventors: Glenn Friedman, Redding, CT (US);
Thomas Creazzo, Tuxedo, NY (US);
Chris Beliveau, Putnam Valley, NY (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 247 days.

(21) Appl. No.: 13/704,818

(22) PCT Filed: Jun. 21, 2011

(86) PCT No.: PCT/US2011/041184
§ 371 (c)(1),
(2), (4) Date: Dec. 17, 2012

(87) PCT Pub. No.: WO2011/163184
PCT Pub. Date: Dec. 29, 2011

(65) Prior Publication Data
US 2013/0096718 A1    Apr. 18, 2013

Related U.S. Application Data

(60) Provisional application No. 61/357,227, filed on Jun. 22, 2010.

(51) Int. Cl.
*G05B 19/401*    (2006.01)
*B25J 9/16*    (2006.01)

(52) U.S. Cl.
CPC ............. *G05B 19/401* (2013.01); *B25J 9/1692* (2013.01)

(58) Field of Classification Search
CPC ................... B25J 9/1692; G05B 2219/39024; G05B 2219/39012; G05B 2219/40565
USPC ............ 700/254, 192, 213, 218, 219; 702/94; 414/222.04, 222.13, 226.04, 936
See application file for complete search history.

(56) References Cited

U.S. PATENT DOCUMENTS 3,908,278 A * 9/1975 Sundahl ........................ 33/502
4,642,781 A   2/1987 Szonyi
(Continued)

FOREIGN PATENT DOCUMENTS

JP    Hei 4-313106 A    11/1992
JP    Hei 6-187021 A    7/1994
(Continued)

*Primary Examiner* — Khoi Tran
*Assistant Examiner* — Ryan Rink
(74) *Attorney, Agent, or Firm* — Dugan & Dugan, P.C.

(57) ABSTRACT

Disclosed are systems and apparatus adapted to aid in calibration of an offset position—between a position sensor and an end effector in a processing system. The system includes a robotic component having an end effector and a position sensor coupled thereto, a teach target having a first geometrical feature, and an offset tool adapted to be engaged by the end effector, the offset tool including a first docking feature. The system further includes a moveable offset target having a second docking feature adapted to be engaged by the first docking feature and a second geometrical feature adapted to be sensed by the position sensor. The end effector moves the offset tool to the offset target and docks them. A position of the teach target and the offset target may then be sensed with the position sensor to determine an actual offset of the end effector with respect to the position sensor. Methods of operating the system are provided, as are other aspects.

8 Claims, 13 Drawing Sheets

(56) References Cited

U.S. PATENT DOCUMENTS

| | | |
|---|---|---|
| 4,908,777 A | 3/1990 | Wolfe |
| 6,438,448 B1* | 8/2002 | Manes et al. ............ 700/218 |
| 6,681,151 B1 | 1/2004 | Weinzimmer et al. |
| 7,015,418 B2* | 3/2006 | Cahill et al. ............ 219/121.69 |
| 7,506,451 B1* | 3/2009 | Ding et al. ............ 33/286 |
| 8,106,349 B2* | 1/2012 | Ding et al. ............ 250/222.1 |
| 2002/0177924 A1* | 11/2002 | Manes et al. ............ 700/218 |
| 2003/0135302 A1* | 7/2003 | Hung et al. ............ 700/245 |
| 2005/0080512 A1* | 4/2005 | Critchlow ............ 700/245 |
| 2007/0260420 A1* | 11/2007 | Johnson et al. ............ 702/152 |
| 2009/0096148 A1* | 4/2009 | Usui ............ 269/45 |
| 2010/0257727 A1* | 10/2010 | Hiraki ............ 29/729 |
| 2010/0271229 A1* | 10/2010 | Allen-Blanchette et al. ............ 340/815.4 |

FOREIGN PATENT DOCUMENTS

| | | |
|---|---|---|
| JP | 2010-58235 A | 3/2010 |
| WO | 2009/072659 A1 | 6/2009 |

\* cited by examiner

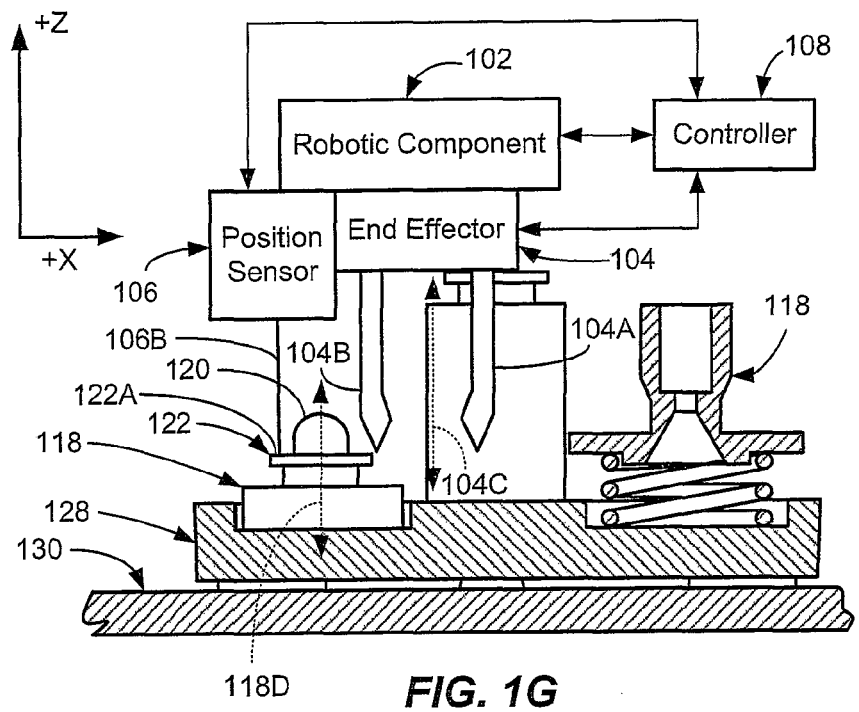
FIG. 1G
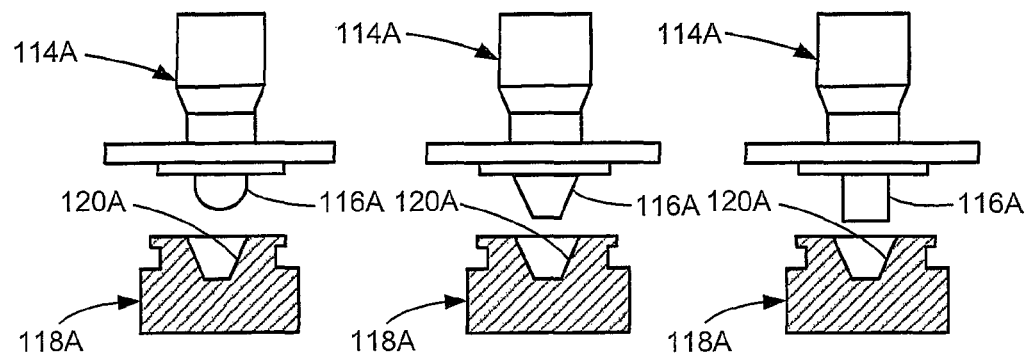
FIG. 1H   FIG. 1I   FIG. 1J

METHODS, SYSTEMS, AND APPARATUS FOR CALIBRATION OF A POSITIONAL OFFSET BETWEEN AN END EFFECTOR AND A POSITION SENSOR

RELATED APPLICATIONS

The present application claims priority to U.S. Provisional Patent Application Ser. No. 61/357,227, filed. Jun. 22, 2010, and entitled "METHODS, SYSTEMS, AND APPARATUS FOR CALIBRATION OF A POSITIONAL OFFSET BETWEEN AN END EFFECTOR AND A POSITION SENSOR," which is hereby incorporated herein by reference in its entirety fox all purposes.

FIELD OF THE invention

The present invention relates generally to systems, apparatus, and methods adapted to calibrate robotic components.

BACKGROUND OF THE INVENTION

In medical testing and processing, the use of robotics may minimize exposure to, or contact with, bodily fluid samples (otherwise referred to as "specimens") and/or may increase productivity. For example, in some automated testing and processing systems (e.g., clinical analyzers and centrifuges), sample containers (such as test tubes, sample cups, vials, and the like) may be transported to and from sample racks (sometimes referred to as "cassettes") and to and from a testing or processing system. Likewise, sample racks themselves may be transported from one location to another in relationship to the testing or processing system.

Such transportation may be accomplished by the use of an automated mechanism, which may include a robotic component (e.g., a moveable robot arm or gantry arrangement) having a moveable end effector which may have two or more gripper fingers coupled thereto. The end effector may be moved in two or more coordinate directions (e.g., X, Y, and Z). In this way, a sample container (containing a specimen to be tested or processed) or sample rack may be gripped by the end effector, and then moved from one location to another in relationship to the testing or processing system.

Inaccurate positioning of the end effector may cause collisions between the end effector and the sample containers, and/or between the sample container being moved and the equipment or sample rack. In the case where the sample rack is moved, inaccurate positioning of the end effector may cause collisions between the sample rack and the testing or processing system. Additionally, inaccurate calibration may contribute to jarring pick and place operations of the sample container and/or sample rack, which may contribute to unwanted spillage of the specimen. Accordingly, systems, apparatus, and methods that may improve accuracy of positioning of sample containers and sample racks being conveyed to and from testing and processing systems are desired.

SUMMARY OF THE INVENTION

According to a first aspect, an improved system is provided. The system includes a robot offset calibration system including a robotic component having an end effector and a position sensor coupled thereto, a teach target having a first geometrical feature, an offset tool adapted to be engaged by the end effector, the offset tool including a first docking feature, and an offset target having a second docking feature adapted to be engaged by the first docking feature and a second geometrical feature adapted to be sensed by the position sensor.

In a method aspect, an improved method of calibrating in a sample container transfer is provided. The method includes providing a robotic component having an end effector and a position sensor coupled thereto, providing a teach target within a work envelope reachable by the end effector, the teach target having a first geometrical feature, providing an offset target reachable by the end effector, the offset target including a second geometrical feature, providing an offset tool, sensing with the position sensor the first geometrical feature of the teach target, engaging the offset tool with the end effector, moving the offset tool to the offset target, docking the offset tool with the offset target, and sensing with the position sensor the second geometrical feature of the offset target.

In an apparatus aspect, a calibration assisting apparatus is provided. The apparatus includes a base, a teach target mounted on the base and having a first geometrical feature adapted to be sensed by a position sensor, an offset tool mounted on the base and having a first docking feature, and an offset target mounted on the base and having a second docking feature adapted to be engaged by the first docking feature of the offset tool and a second geometrical feature adapted to be sensed by a position sensor.

In another apparatus aspect, a calibration assisting assembly is provided. The assembly includes a tray, a nesting tool coupled to the tray, the nesting tool including a base, a teach target mounted on the base and having a first geometrical feature adapted to be sensed by a position sensor, an offset tool mounted on the base and having a first docking feature, and an offset target mounted on the base and having a second docking feature adapted to be engaged by the first docking feature of the offset tool and a second geometrical feature adapted to be sensed by a position sensor.

Still other aspects, features, and advantages of the present invention may be readily apparent from the following detailed description by illustrating a number of example embodiments and implementations, including the best mode contemplated for carrying out the present invention. The present invention may also be capable of other and different embodiments, and its several details may be modified in various respects, all without departing from the spirit and scope of the present invention. Accordingly, the drawings and descriptions are to be regarded as illustrative in nature, and not as restrictive. The drawings are not necessarily drawn to scale. The invention is to cover all modifications, equivalents, and alternatives failing within the spirit and scope of the invention.

BRIEF DESCRIPTION OF THE DRAWINGS

FIG. 1A is a partially cross sectioned side view illustration of an example of a calibration assisting assembly according to embodiments of the invention.

FIG. 1G is a side view depiction of the position sensor measuring location coordinates of the offset target according to embodiments of the invention.

FIGS. 1H-1J are partially cross-sectioned side view depictions of the alternative docking features for the offset tool and the offset target according to embodiments of the invention.

DETAILED DESCRIPTION

Figure 1B:
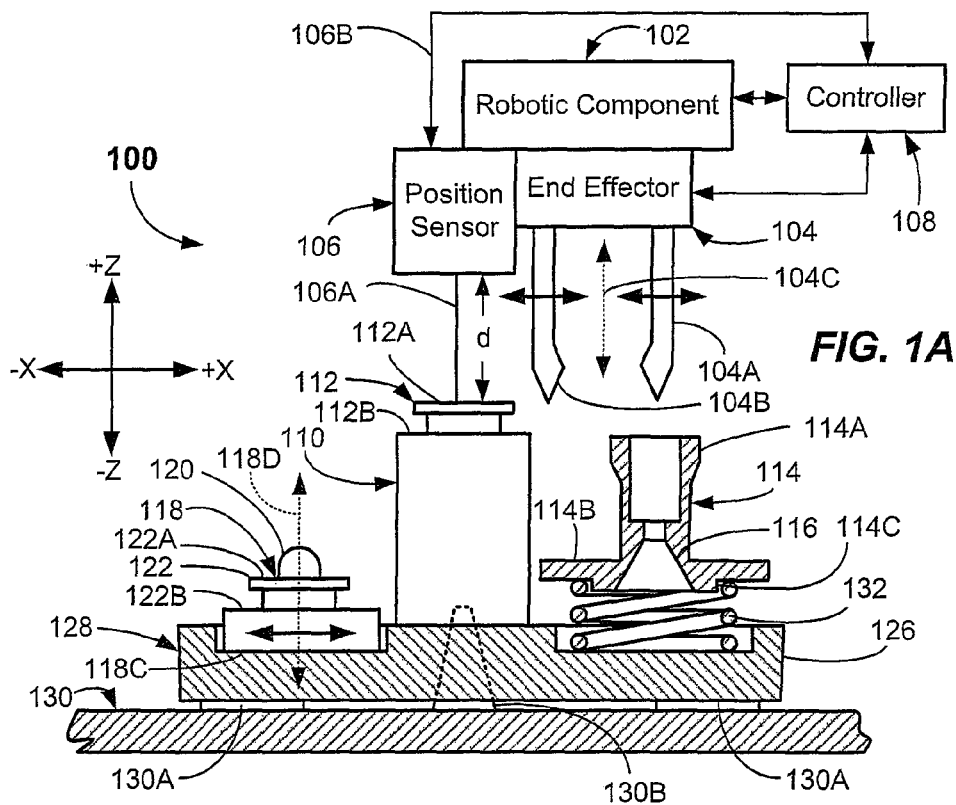
FIGS. 1B-C are side view graphical depictions that illustrate motion of a position, sensor relative to a teach target according to embodiments of the invention.

In robotic apparatus, such as those used to accomplish robotic pick and place operations, for the aforementioned reasons, achieving precision in the placement of a robotic end effector is desirable. "End effector" as used herein is any member coupled to a robot that is used for robotic operations such as pick and place operations. In some systems, a positional sensor (e.g., a ranging sensor) may be employed with the robotic end effector in the robotic system. In such robotic systems, positional precision to several thousands of an inch or less may be desirable. However, in many instances, tolerance stack-ups from the multitude of connected system components may amount to many thousands, or even tens or hundreds of thousands of an inch. Accordingly, means for appropriately determining an actual positional offset (e.g., in x, y, and z space) between a robotic end effector and a positional sensor in such robotic systems is desired. Furthermore, once calibrated with the appropriate positional offsets, it may be desirable to precisely locate other system components reachable by the robotic apparatus.

In view of the foregoing problems, the present invention provides calibration methods, calibration assisting systems, and calibration assisting apparatus for readily determining an actual (real) positional offset between an end effector and a position sensor in a robotic system. According to a first aspect, a calibration method includes providing a teach target, an offset tool, and an offset target, which are collectively used to obtain a positional offset between the end effector and the position sensor of the robotic system. According to the method, the position sensor may sense (measure) a first geometrical feature of the teach target so as to obtain first positional information (e.g., X, Y and Z). The offset too is engaged (e.g., grasped) by the end effector in a known orientation relative to the end effector and moved to a position of the offset target. Once there, the offset tool is docked with the offset target. The docking may involve mating docking features of the offset tool with the offset target. For example, one or more surfaces of the offset tool may be docked with one or more surfaces of the offset target. One or more of the docking surfaces may be inclined relative to a vertical axis (e.g., Z axis). The act of docking may cause the offset target to shift or move slightly in one or more directions (e.g., cause movement in x-y space) in the likely event that some tolerance stack-up is present in the robotic system. In any event, the act of docking positions a centerline of the offset target so that it is coincident with a centerline of the end effector (e.g., in x-y space). A second geometrical feature of the offset target having a known relationship to the offset target's centerline (preferably coincident therewith) and another surface (e.g., a top surface) may then be measured with the position sensor. From the collective measured positional coordinate information from the teach target and offset target, a positional offset between the machine position of the end effector and the actual position sensed by the position sensor may be determined in one or more coordinate directions. This may include determining actual offsets in the X, Y, or Z directions, the X and Y only, X and Z only, X and Y only, and preferably in all three directions (e.g., in X, Y, and Z).

In another aspect, a calibration assisting apparatus is provided. The calibration assisting apparatus, which is referred to herein as a "nesting tool," includes a base, a teach target mounted on the base, the teach target having a first geometrical feature adapted to be sensed by a position sensor; an offset tool mounted on the base and having a first docking feature, and an offset target slidably mounted on the base and having a second docking feature adapted to be engaged by the first docking feature of the offset tool and also having a second geometrical feature adapted to be sensed by the position sensor. In another aspect, the calibration assisting assembly may include a tray onto which the above-described nesting tool is coupled. However, it should be apparent that the nesting tool may be positioned anywhere within the reach of the robotic apparatus. Further, more than one nesting tool may be employed.

In another aspect, a robot offset calibration system is provided. The offset calibration system includes a robotic component having an end effector and a position sensor couple thereto, a teach target having a first geometrical feature, an offset tool adapted to be engaged by the end effector, the offset tool including a first docking feature, and an offset target having a second docking feature adapted to be engaged by the first docking feature and also having a second geometrical feature adapted to be sensed by the position sensor.

These and other aspects and features of the invention will be described with reference to FIGS. 1A-7 herein.

In accordance with a first embodiment of the invention, as best shown in FIG. 1A, a robot offset calibration system 100 is described. The robot offset calibration system 100 is useful for aiding in the calibration of any robotic system, such as those used in automated clinical analyzers, centrifuges, or other processing systems (e.g., bio-fluid specimen processing systems). The robot offset calibration system 100 includes a robotic apparatus including a robotic component 102 having an end effector 104 and a position sensor 106 each being coupled thereto. The position sensor 106 may be coupled directly to a portion of the end effector 104 or to a portion of the robotic component (e.g., to a robot arm, boom, or beam), but the location between the end effector 104 and the position sensor 106 is fixed. Likewise, the dimension between the lower terminal ends of the gripper fingers 104A, 104B of end effector 104 and the preset far and near ranges of the position sensor 106 is also fixed.

A controller 108 may command the robotic component 102 and attached end effector 104 and position sensor 106 to move in one or more coordinate directions, and preferably two or more or even three directions, but preferably in X, Y, and Z coordinate space, where Y is into and out of the paper in FIG. 1A. Any suitable robotic component 102 may be used, such as a moveable robot arm, boom, or beam having the end effector 104 coupled thereto. In some embodiments, the robotic component 102 may include one or more shoulder, elbow, or wrist elements to accomplish three-dimensional motion of the end effector 104.

Figure 2A:
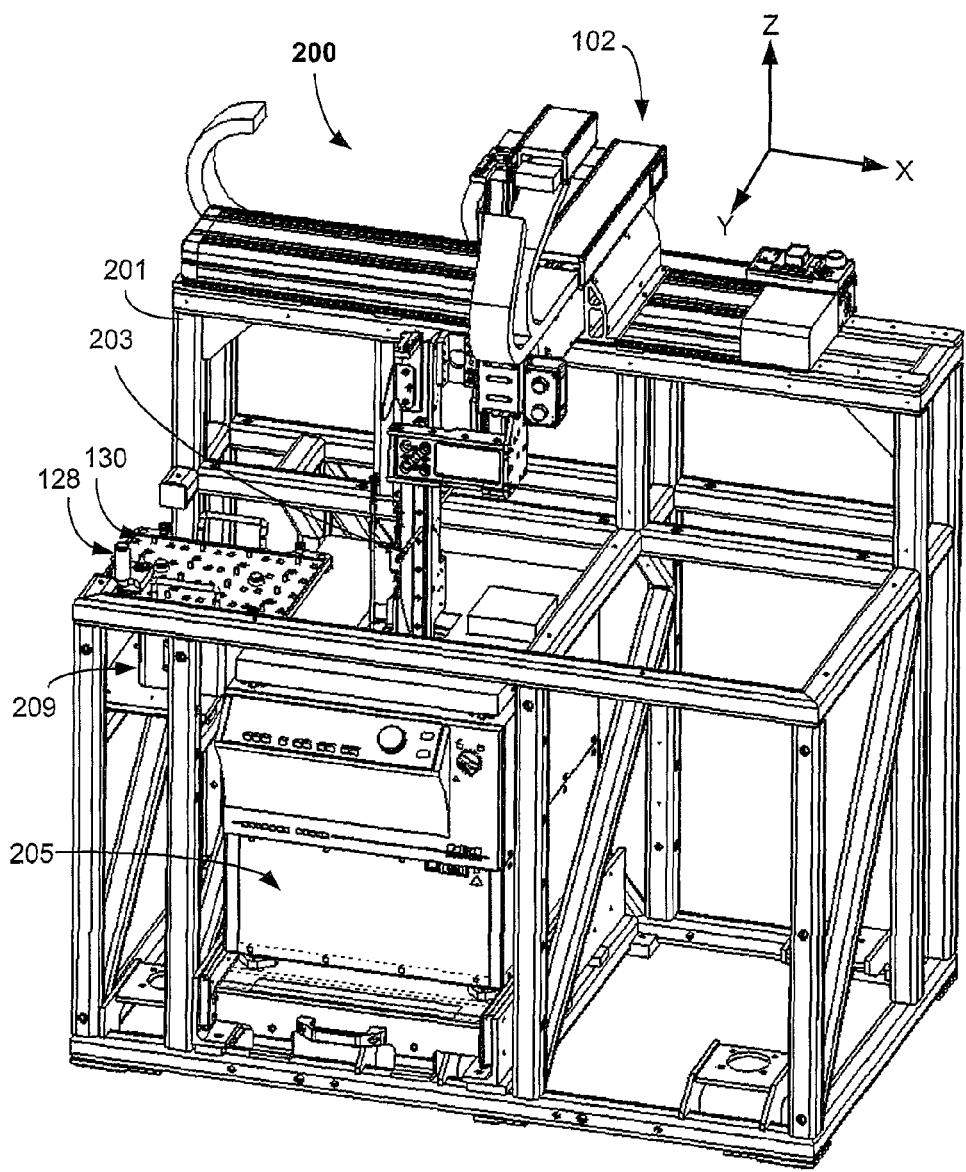
FIG. 2A is a perspective view illustration of a testing system including an example calibration assisting assembly having a nesting tool coupled to a tray according to embodiments of the present invention.
Figure 2B:
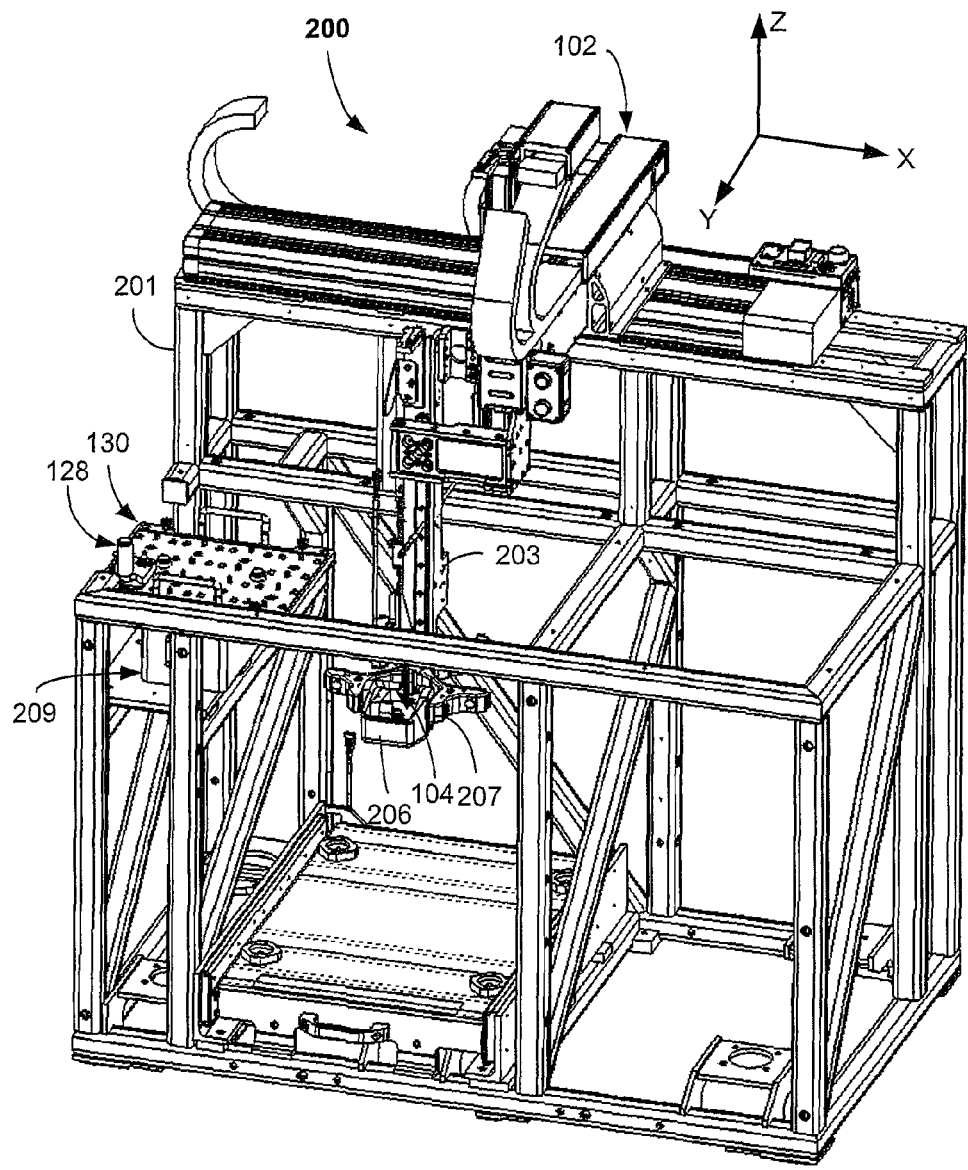
FIG. 2B is a perspective view illustration of the testing system of FIG. 2A the example calibration assisting assembly with various centrifuge components removed for clarity according to embodiments of the present invention.
Figure 2C:
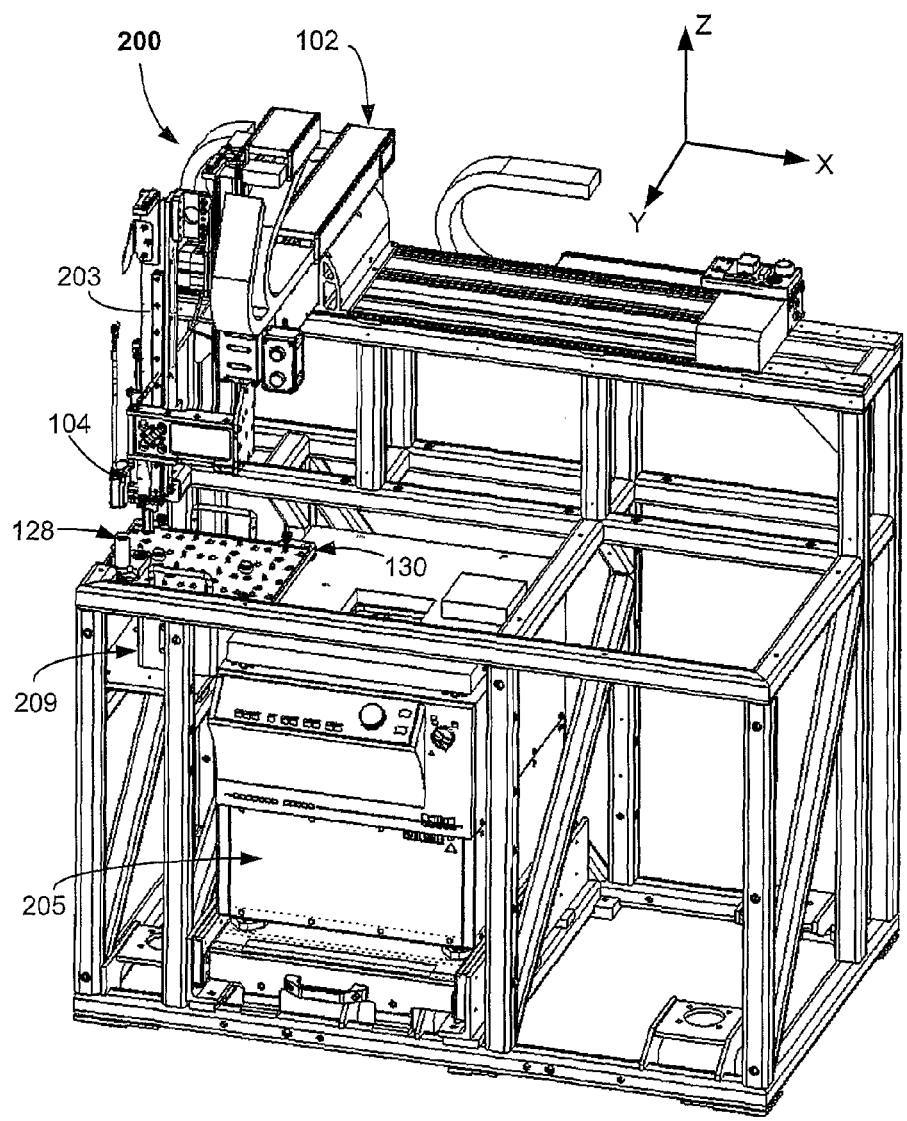
FIG. 2C is a perspective view illustration of the testing system of FIG. 2A including an example robotic apparatus positioned over the nesting tool according to embodiments of the present invention.

In other embodiments, such as in the processing system 200 of FIG. 2A-2C, the robotic component 102 may be mounted to a frame 201 and may include a moveable gantry arrangement with the end effector 104 which is mounted to a boom 203. The boom 203 may be moveable (e.g., in the Z direction) on a suitable track or guide. Furthermore, the boom 203 (and the end effector 104) may be moveable along a track or guide in one or more additional directions (e.g., the X and/or Y directions). In the depicted embodiment, movement of the end effector 104 is provided in the X, Y, and Z coordinate directions. The means for moving the robotic component 102 may include any suitable conventional motion-producing mechanism, such as a stepper motor, servo motor, pneumatic or hydraulic motor, electric motor, etc. Furthermore, drive systems including chains, guides, pulleys and belt arrangements, gear or worm drives or other conventional drive components may be utilized to cause the motion of the robotic component 102 and coupled end effector 104. Other types of robot apparatus may be employed.

Figure 5A:
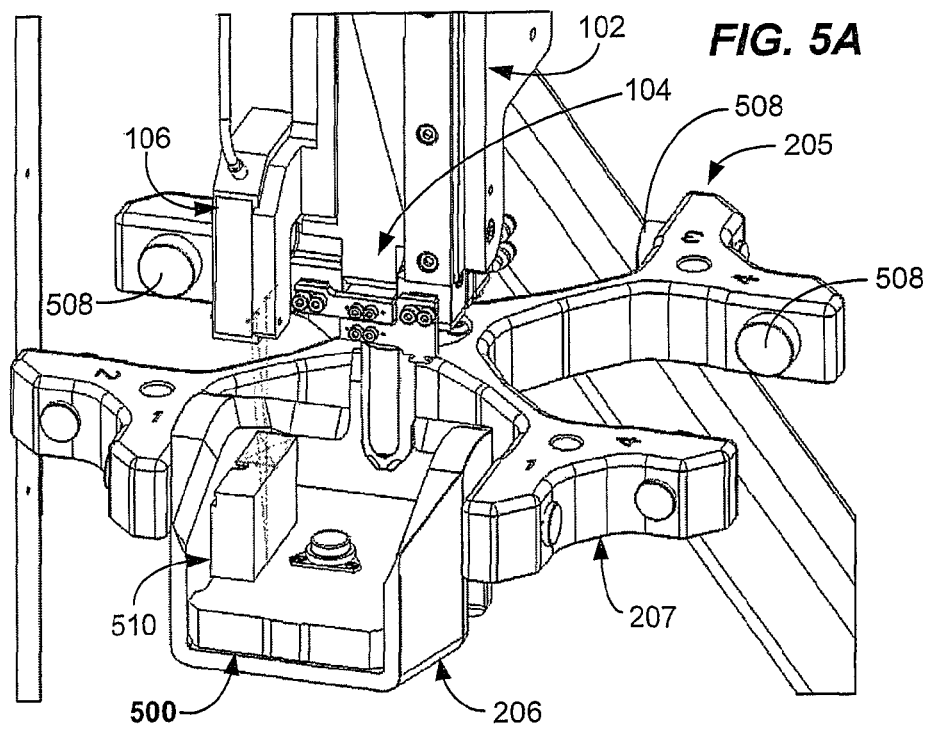
FIG. 5A is a perspective partial view of an example calibration block installed in a cradle of a centrifuge according to embodiments of the present invention.

The processing system 200 depicted is an automated centrifuge system adapted to separate various components of specimens provided therein. In particular, the centrifuge 205 may be a Hettich centrifuge available from Hettich Centrifuges of Beverly, Mass., that is adapted to receive sample racks (otherwise referred to as "sample cassettes") in a bucket 206 pivotally mounted to a yolk 207 of the centrifuge 205 (See FIG. 2A-2C and FIG. 5A). Only the bucket 206 and yolk 207 of the centrifuge 205 are shown in FIG. 2B and FIG. 5A for clarity. A tray 130 of the processing system 200 may be coupled to a weighing mechanism 209 (e.g., a weight scale) adapted to measure the weight of each of the cassettes, etc. resting on the tray 130. The nesting tool 128 is also shown mounted on the tray 130. Other processing components may be attached to the frame 201, but are not shown for clarity. Although the depicted examples are directed at a processing system 200 that is an automated centrifuge system, it should be understood that the present invention method, calibration assisting apparatus, system, and nesting tool have utility for other types of automated processing systems as well as automated testing systems.

Again referring to FIG. 1A, the opposed gripper fingers 104A, 104B (only one finger 104A shown in FIG. 2C) may be driven to open and close along any suitable direction in the X-Y plane e.g., in the X or Y direction) by a suitable end effector drive apparatus, such as a servo motor or the like. For example, a pneumatic or hydraulic servo motor or electric motor may be used. Any suitable mechanism for causing gripping action of the fingers 104A, 104B may be used. Furthermore, although two fingers are shown, the present invention is equally applicable to end effectors having more than two fingers or grippers.

Again referring to FIG. 1A, the robot offset calibration system 100 includes a teach target 110, an offset tool 114, and an offset target 118. The teach target 110, offset tool 114, and offset target 118 may be mounted on a common base 126 and may make up the components of a nesting tool 128. The nesting tool 128 may be placed on the processing system 200 (FIGS. 2A-2O) at any location within the reach of the robotic component 102 and may be used to assist in a determination (calibration) of a positional offset between the end effector 104 and the position sensor 106 of the robot offset calibration system 100.

In the depicted embodiment, the teach target 110 is a generally cylindrical post extending upwardly from the base 126 of the nesting tool 128 and includes a first geometrical feature 112 formed thereon. The teach target 110 may be fastened to the base 126 by any suitable means, such as screws, bolts, press fit, adhesive, brazing, welding, or other suitable fastening system. The first geometrical feature 112 may be a disc, a rectangle, a square, or any other shaped geometric feature including edges that may be located by the position sensor 106 in at least one direction, but preferably at least in the X and Y directions, and preferably in the X, Y, and Z directions. The first geometrical feature 112 may include a first planar surface 112A that lies substantially in the X-Y plane and may include two or more stepped edge surfaces at opposite sides thereof. The first planar surface 112A is adapted to be sensed by the position sensor 106 in the vertical (Z direction). The first planar surface 112A may be vertically offset from, and different (e.g., smaller) in lateral overall outside dimension than, a second planar surface 112B of the teach target 110 lying at a different vertical level (e.g., vertically lower) than the first planar surface 112A, thereby providing vertically-stepped surfaces. The measured surfaces 112A, 112B and edges should be precision machined such that their location on the nesting tool 128 is precisely known.

The offset tool 114 may be adapted to be engaged by the end effector 104 (e.g., by gripper fingers 104A, 104B). The offset tool 114 may include a first docking feature 116, which is adapted to be engaged with a second docking feature 120 of the offset target 118. In some embodiments, the first docking feature 116 and the second docking feature 120 may include engaging surfaces (e.g., one or more inclined surfaces) to be described more fully below. The offset tool 114 may include a pilot 114A extending vertically in the Z direction from the location of the first docking feature 116 and a shelf 114B, which may extend laterally in the X-Y plane, for example. The shelf 114B is adapted to be contacted by the end effector 104 when the end effector 104 grasps the offset tool 114. In particular, the fingers 104A, 104B are placed in vertical contact with an upper surface of the shelf 114B as the offset tool 114 is grasped (See FIG. 1E). The offset tool 114 may further include a positioning feature 114C, such as a centering pilot on a lower surface, to roughly position the offset tool 114 relative to the base 126. In some embodiments, the offset tool 114 is stationed on a compliant member 132 of the nesting tool 128. This positions the offset tool 114 relative to the base 126 so that the offset tool 114 may be located and grasped by the end effector 104. Other types of centering features may be used.

The compliant member 132 may be any suitable spring member, such as a helical or coil spring, wave spring, leaf spring, volute spring, Bellville spring, air spring, etc. The compliant member 132 may be suitably mounted so that movement relative to the base 126 is limited. Providing a compliant member 132 allows for ease of grasping the offset tool 114 while minimizing load spikes as the ends of fingers 104A, 104B contact the shelf 114B.

The offset target 118 may also be mounted on the base 126. The offset target 118 may include a second geometrical feature 122 adapted and oriented to be sensed by the position sensor 106. In some embodiments, the first and second geometrical features 112, 122 may include substantially similar features. For example, they may both include circular discs of substantially the same diameter formed or provided thereon. Furthermore, the second geometrical feature 122 may include first and second offset (e.g., planar) surfaces 122A, 122B, as described above for the teach target 110.

The docking features 116, 120 may be any suitable geometric features including engaging surfaces, which allow for centering of the offset target 118 in the X, Y, or X and Y directions relative to the end effector 104. In the depicted embodiment, the first docking feature 116 comprises a conical (inclined) surface formed on an underside of the offset tool 114. However, the inclined surface may be a compound inclined surface (See FIG. 4C). For example, the first docking feature 116 may include multiple intersecting conical surfaces oriented at different cone angles or arcuate (curved) surfaces. The second docking feature 120 of the offset target 118 may also include inclined surfaces, which are adapted to interface with the engagement surfaces of the first docking feature 116. For example, the second docking feature 120 may be formed on an upper portion of the offset target 118.

Figure 1C:
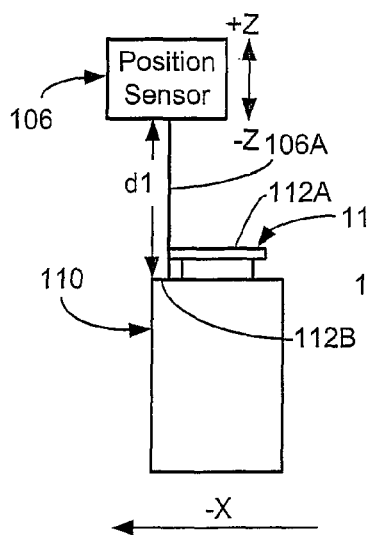
Figure 1D:
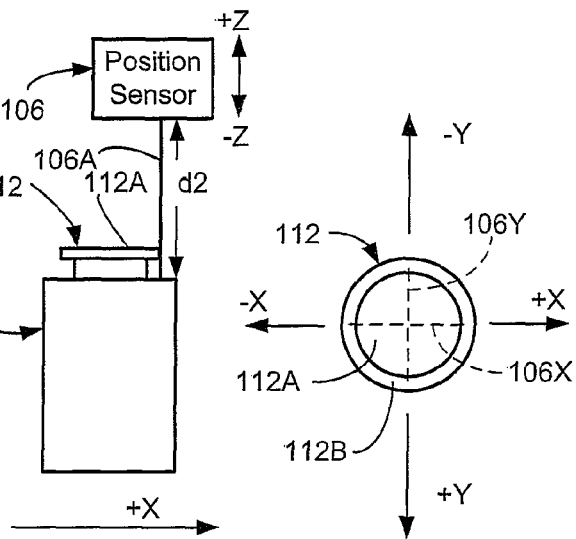
FIG. 1D is a top view graphical depiction that illustrates motion and positioning of a position sensor relative to a teach target in X-Y coordinates according to embodiments of the invention.
Figure 1E:
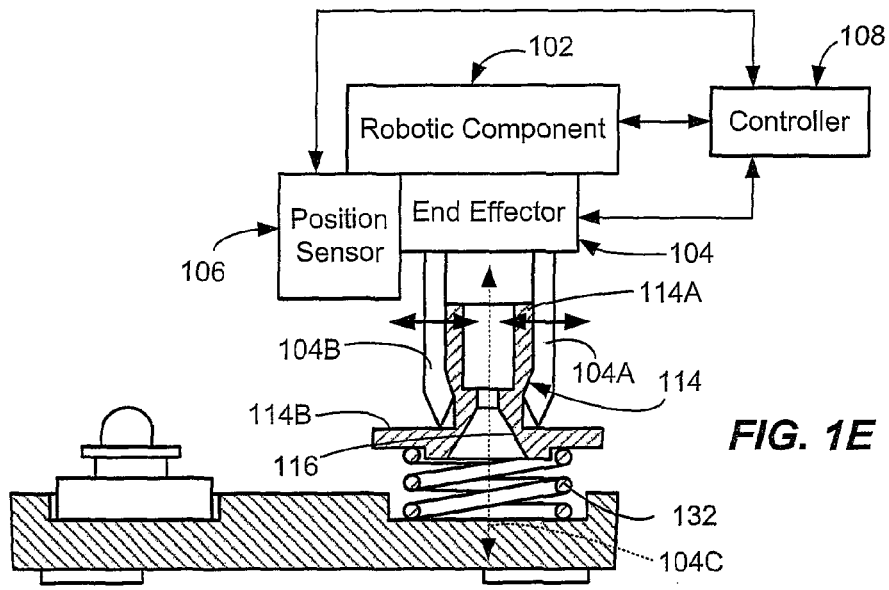
FIG. 1E is a side view depiction of the end effector grasping and picking up an offset tool according to embodiments of the invention.
Figure 1F:
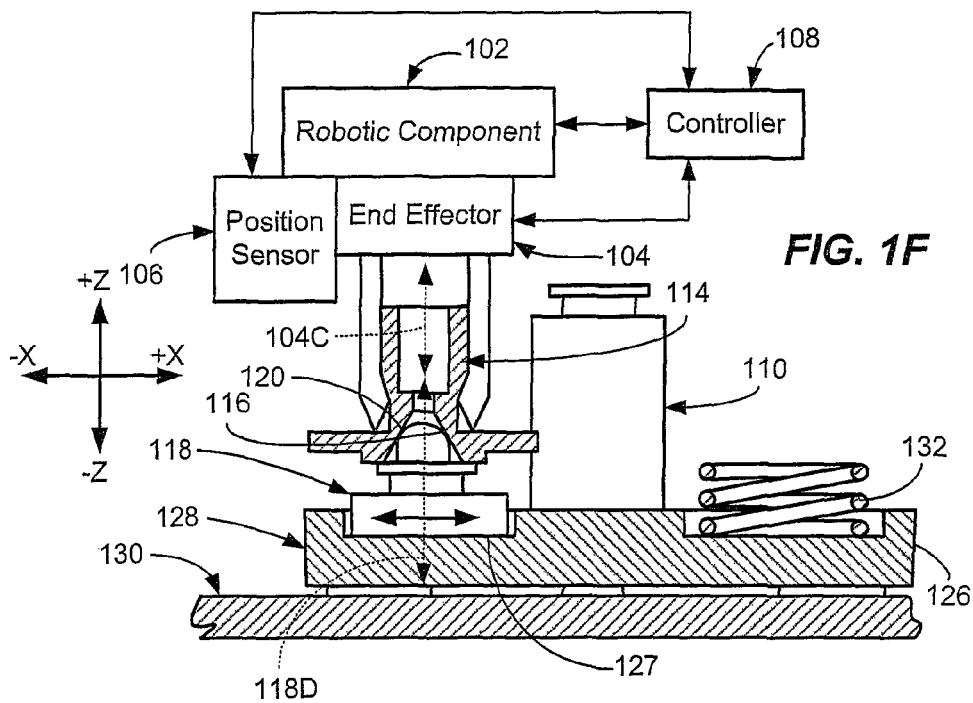
FIG. 1F is a side view depiction of the end effector docking an offset tool with a moveable offset target according to embodiments of the invention.

In the depicted embodiment of FIGS. 1A and 1F, the second docking feature 120 includes an inclined surface which comprises a curved surface (e.g., a spherical surface) and is precisely centered relative to the second geometrical feature 122 (e.g., a disc). The portion of the spherical surface that contacts the first docking feature 116 is inclined relative to a vertical axis (Z axis). However, a conical surface or other inclined or curved surface shape may be employed as the second docking feature 120. Optionally, as is shown in FIGS. 1H-1J, the docking features 116, 120 of the offset tool 114 and the offset target 118A, respectively, of FIGS. 1A and 1F may be reversed. For example, as shown in FIGS. 1H-1J, an extending (convex) feature 116A may be provided on the offset tool 114A and a receiving (concave) feature 120A may be provided on the offset target 118A. Any combination of interfacing concave and convex members may be employed as the first and second docking features 116A, 120A. In some embodiments, only one of the docking features may include an inclined surface (See FIG. 1J), although it is preferred that both include an inclined surface. The docking features 116A, 120A may both include conical surfaces as shown in FIG. 1I, but matching such features may introduce later shift errors. Thus, such matched features should only be employed where a relatively lower level of accuracy may be tolerated. Any suitable geometry that allows for centering of the offset target 118 in the X and/or Y coordinate directions may be used. However, a configuration as shown in FIG. 1H including docking features 116A, 120A (or 116, 120 as shown in FIG. 1H) including a spherical surface on one member and a conical surface on the other provides excellent location precision.

The offset target 118 may include a smooth planer lower surface 118C, which engages with a smooth planar surface of the base 126. The act of clocking as shown in FIG. 1F aligns (moves) the offset target centerline 118D with the centerline 104C of the end effector 104 when the end effector 104 is located at a predetermined second nominal location of the offset target 118 in X, Y space.

In the depicted embodiment of FIG. 1A-1F, the position sensor 106 is a laser ranging sensor, which is adapted to emit multiple intersecting laser beams 106A towards a target (only one beam shown for clarity). In the depicted embodiment, the position sensor 106 may be operable to sense a position of an article (e.g., a cassette, specimen container or vial, test tube, cuvette, tool, etc.) to be grasped, or a position of a feature (e.g., a hole, slot, pilot, pin, edge, etc.) at a location where the article is to be placed. The position sensor 106 may be any suitable position sensor adapted to determine a position in one or more coordinate directions, but a laser ranging sensor is preferred. A class 2, red, laser ranging sensor available from Banner Engineering of Minneapolis, Minn. was found to be effective. Other types of laser sensors may be used depending on the number of coordinate dimensions desired to be measured. Other types of position sensors (e.g., contact type) may be used as well.

In the present calibration assisting system and method, the position sensor 106 is adapted to sense the first geometrical feature 112. For example, as shown in FIG. 1A, the position sensor 106 may be moved from a nominal at rest position at (X0, Y0, Z0) to a known nominal position above the teach target 110. The teach target 110 may be provided, as part of the calibration process, at a nominally known position in X, Y, Z space so that the controller 108 may command the movement of the position sensor 106 to that nominal location in space. For example, the teach target 110 may be provided at any known position within the reach (working envelope) of the robotic component 102. In some embodiments, the nesting tool 128 may be placed manually by an operator at the predefined location and orientation in X, Y, Z space, or even by grasping the nesting tool 128 with the end effector 104 and placing it on positioning elements (e.g., pins) on a portion of the processing system 200.

Figure 3:
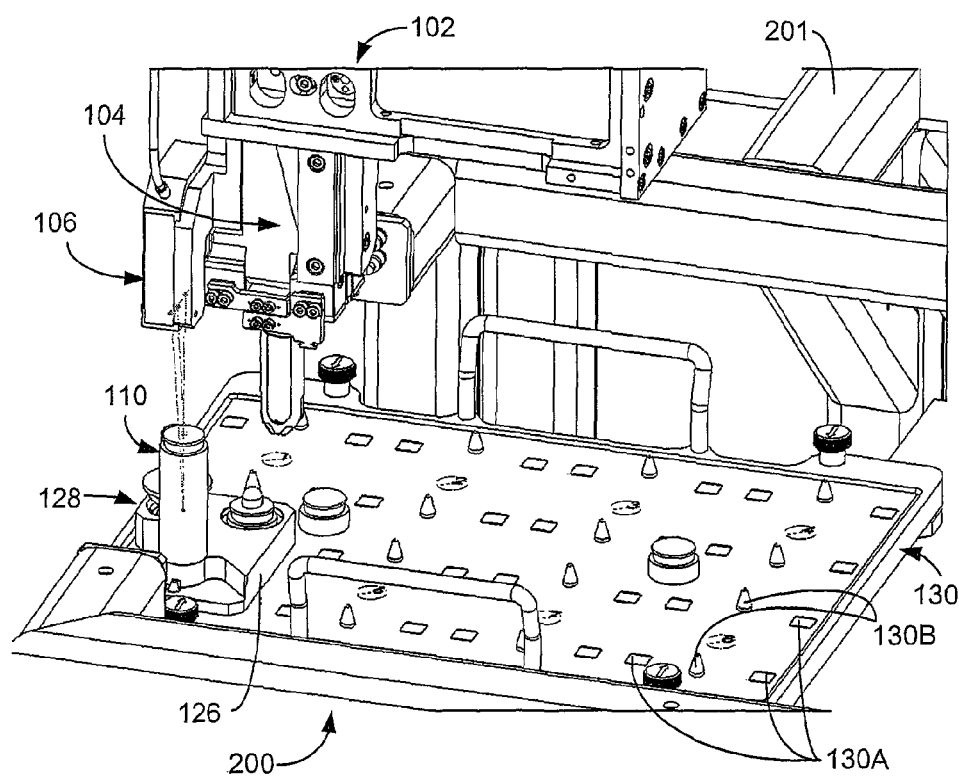
FIG. 3 is a partial perspective view illustration of an example calibration assisting assembly having a nesting tool coupled to a tray according to embodiments of the present invention.

In some embodiments, as best shown in FIG. 3, the teach target 110 may be coupled to the base 126 of the nesting tool 128, which may then be coupled to a tray 130 of a processing system 200. The tray 130 may be removable from the frame 201 of the processing system 200. The approximate nominal position of the teach target 110 is known because the teach target 110 is provided in a fixed position and orientation relative to the nesting tool 128, and the base 126 of the nesting tool 128 is provided in a nominally known position on the tray 130 provided on the frame 201 within reach of the robotic component 102. For example, as shown in FIG. 1A and FIG. 3, the base 126 may rest on one or more pads 130A (preferably three pads) formed on the tray 130 or on the nesting tool 128. Two or more tray projections 130B (e.g., tapered pins) extending from the tray 130 may couple with like tapered holes, or a hole and slot (shown dotted in FIG. 1A) to further aid in positively positioning the nesting tool 128 relative to the tray 130. Optionally, pins may be formed on the nesting tool 128 and may be received in holes (or a hole and a slot) formed in the tray 130. Thus, it should be apparent that the nesting tool 128 is configured to be moveable, but may be precisely located at one or more desirable locations within the reach of the robotic component 102 and end effector 104. A plurality of sample racks (not shown) including specimen containers may be received on the tray 130 for processing.

Figure 4A:
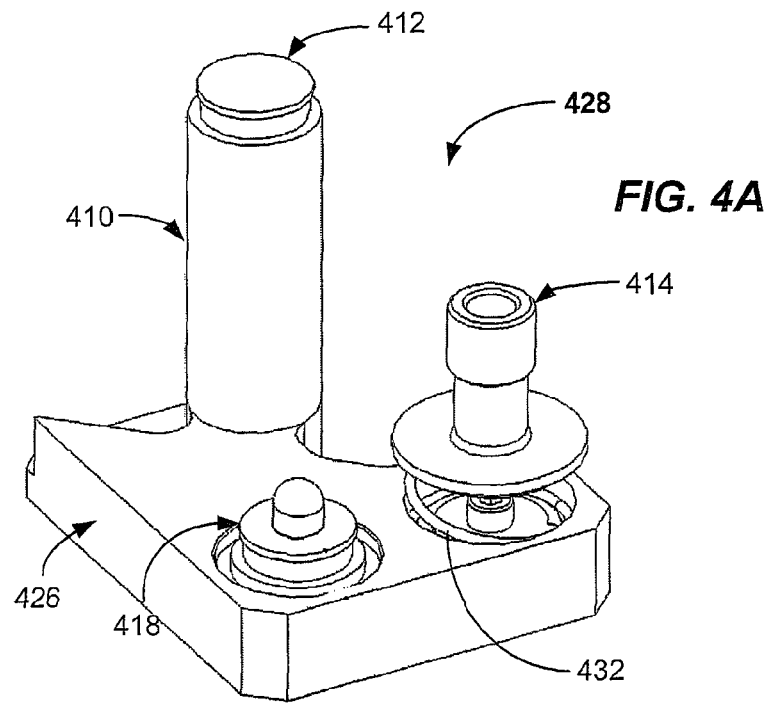
FIGS. 4A-4C are perspective views of an example of a nesting tool according to embodiments of the present invention.
Figure 4B:
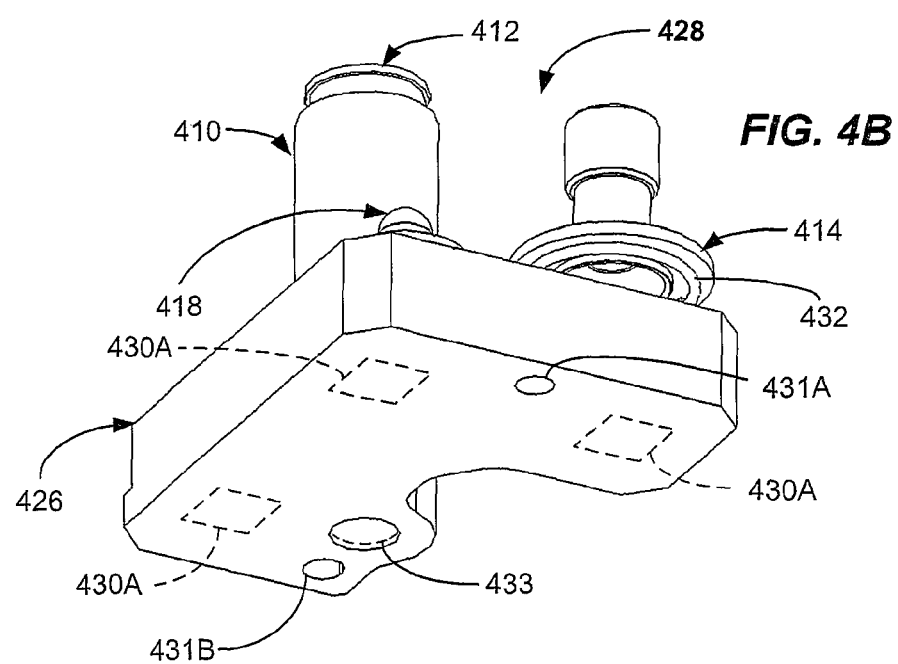
Figure 4C:
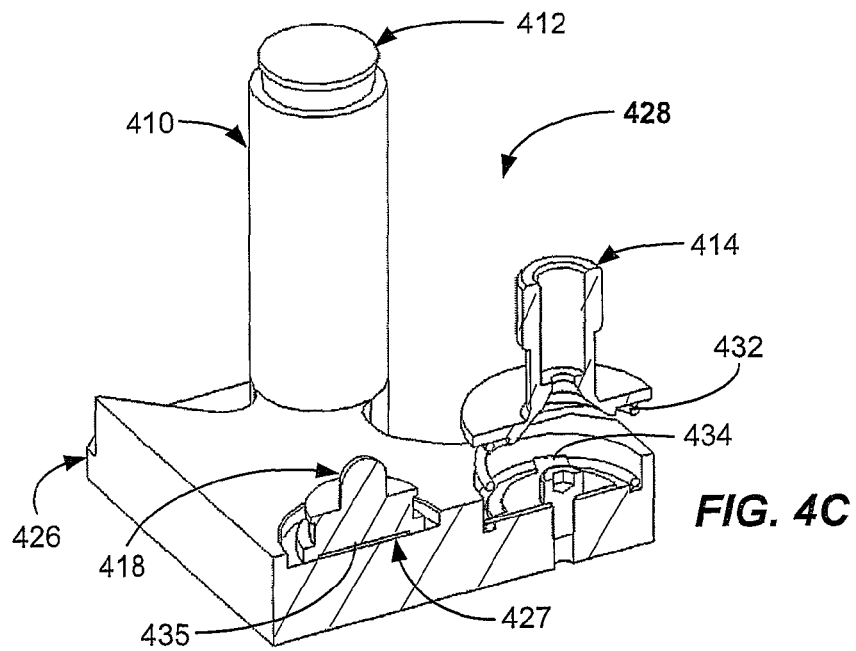

Another embodiment of the nesting tool 428 including the teach target 410, offset tool 414, and offset target 418 mounted on a common base 426 is shown in FIGS. 4A-4C. As depicted, the base 426 includes a generally L-shape configuration including a first branch and a second branch arranged approximately perpendicularly to one another such that the aforementioned pads 130A of the tray 130 will contact the base 426 at three locations (shown dotted, thereby providing stability. A hole 431A and a slot 431B (shown only slightly elongated) may be formed in the underside of the base 426 and are adapted to receive and locate on the pins 130B of the tray 130 (see FIG. 3). A threaded portion (not shown) of the teach target 410 may be received in a threaded hole 433 provided in the base 426. The teach target 410, offset tool 414, offset target 418, and base 426 may each be manufactured from a suitable rigid material such as, e.g., stainless tool steel. FIG. 4C illustrates the nesting tool 428 with the offset tool 414 and offset target 418 shown cross sectioned. As can be seen, the offset tool 414 may be stationed on a compliant member 432 (e.g., a coil spring) and the compliant member 432 may be retained relative to the base 426 by a spring retainer 434. As shown in FIG. 4C, a portion 435 (e.g., a central underside portion) of the offset target 418 may be recessed slightly so that it does not contact the recess 427. Accordingly, a friction force to slide the offset target 418 in the recess 427 of the base 426 may be minimized.

Figure 5B:
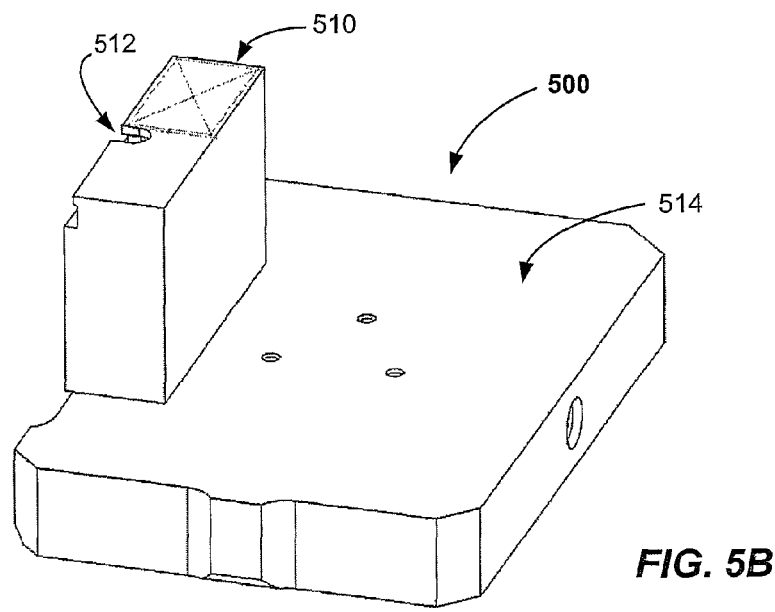
FIGS. 5B-5C are perspective views of the example teach target of FIG. 5A according to embodiments of the present invention.
Figure 5C:
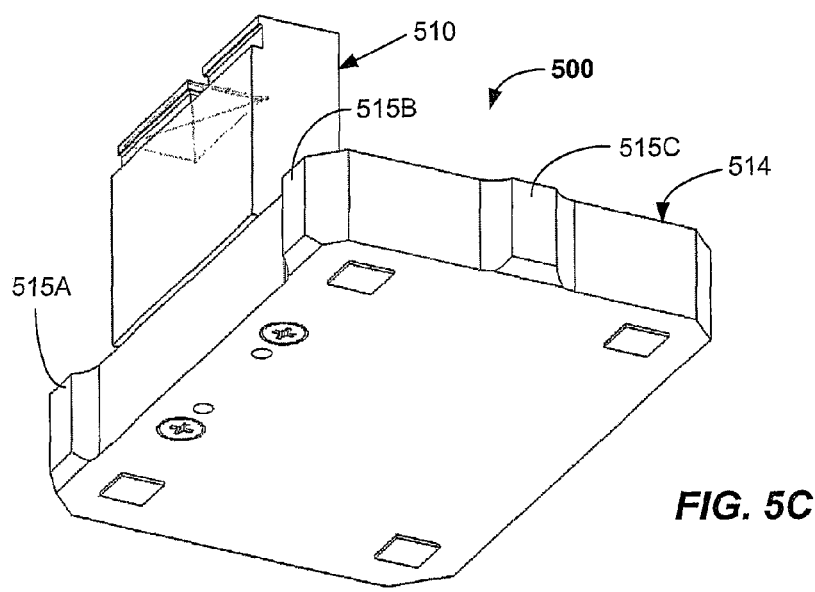

FIGS. 5A-5C illustrate a teach target assembly 500 including a teach target 510 mountable in a bucket 206 of a centrifuge 205. The bucket 206 is rotationally mounted for pivotal motion on a yolk 207. When a sample rack containing specimen containers (not shown) is received in the bucket 206 and the centrifuge 205 is spun (rotated) to operating speed, the bucket 206 will be thrown outwardly due to centrifugal force and pivot about the respective mounting pivots 508 (shown for bucket mounting locations 2, 3 and 4). Once the robot offset is properly calibrated using the method discussed herein, the teach target 510 may be employed to precisely locate the bucket 206 relative to the end effector 104, such that transfers of the sample racks to the bucket 206 may be carried out with relative precision. The teach target 510 may be sensed with the position sensor 106 at another location within the reach of the robotic component 102, such as at another bucket 206 (only one bucket shown) or another location.

Figure 5D:
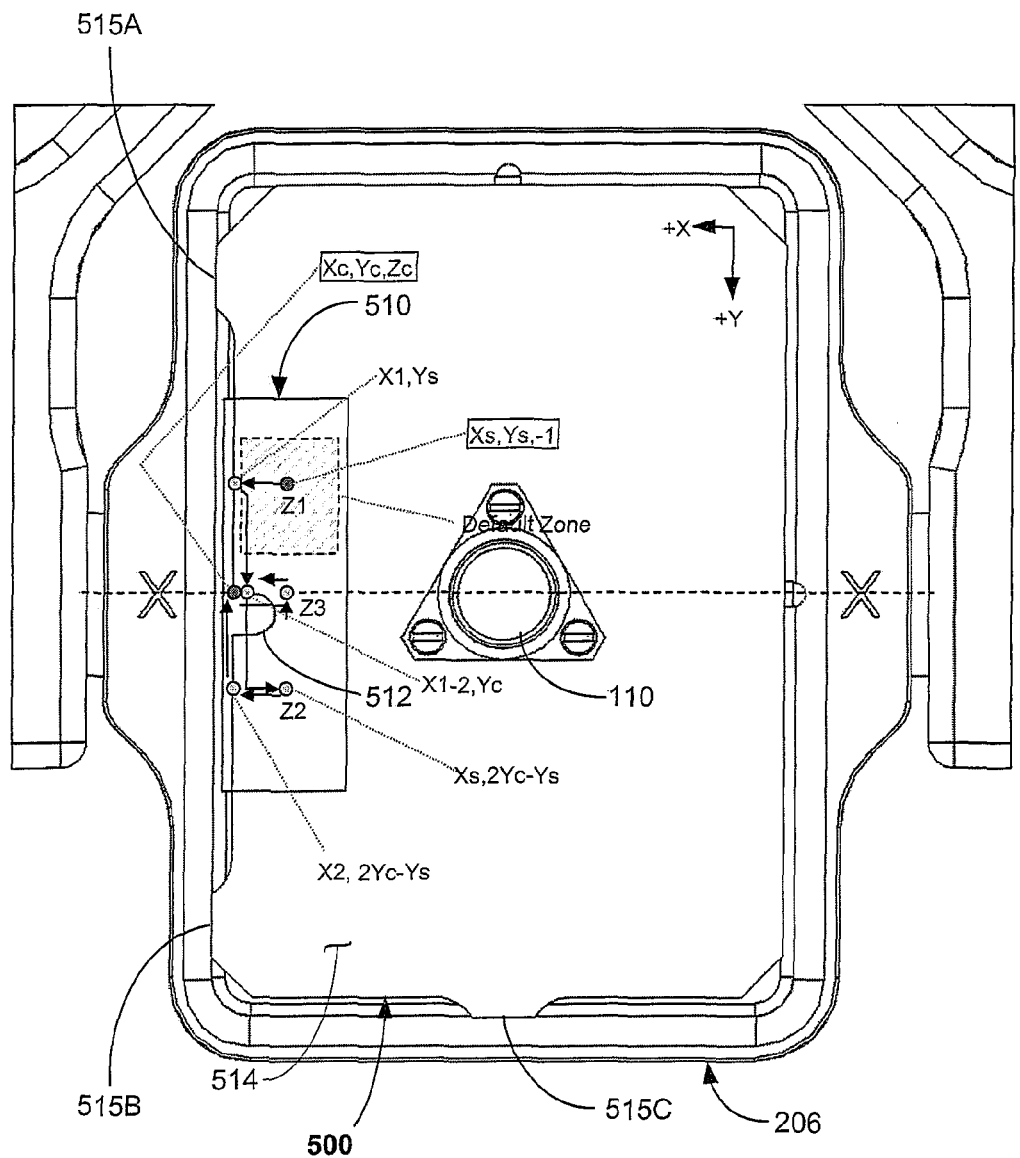
FIG. 5D is a top view of the example teach target of FIG. 5A according to embodiments of the present invention.

Top and bottom views, respectively, of the teach target assembly 500 are shown in FIGS. 5B and 5C. The teach target assembly 500 may include a locator base 514 having the teach target 510 mounted thereto. Mounting may be by suitable fastening means (e.g., screws). The locator base 514 may include locator points 515A-515C adapted to contact precisely formed portions of the bucket 206 such that the locator base 514 is precisely positioned in a bottom of the bucket 206 (See FIG. 5D). Once positioned, the controller 108 (FIG. 1A) may cause the robotic component 102 to move to position the position sensor 106 at the nominal location of the teach target 510. As shown in FIG. 5D, a routine is then carried out to locate a geometrical feature 512 on the teach target 510. The routine may be as follows:

Start above bucket 206
Move down until position sensor 106 (e.g., laser ranging sensor) turns ON (at Far range of sensor) at Z1
Record Z1 reading
Move down 1 mm until laser turns OFF (at near range of sensor)
Move in +X direction until position sensor 106 turns ON to find $1^{st}$ vertical edge Xs, Ys
Move 2 mm in −X (laser OFF) and in +Y until laser turns ON
Find $1^{st}$ horizontal edge at X1-2, Yc
Move in +Y to 2Yc-Ys (laser OFF) and in −X to Xs
Find, $2^{nd}$ Z at Z2
Move 1 mm down to turn laser OFF.
Move in +X until laser turns ON.
Find $2^{nd}$ vertical edge X2, 2Yc-Ys Since Xc=(X1+X2)/2 and Zc=(Z1+Z2)/2
Teach target corner is found: Xc, Yc, Zc
Using the above method, the exact positional location of the geometrical feature 512 in X, Y, Z space may be found. Accordingly, the location of geometrical features of the bucket 206 may be precisely determined. It should be understood that one or more additional teach targets (e.g., teach target 110) may be used on the teach target assembly 500, or on any other component of the processing system 200 within the reach of the position sensor 106 to aid in precisely locating that component.

An embodiment of an example method of the invention will now be described with reference to FIGS. 1A-1G. According to the method, and as shown in FIG. 1A, the position sensor 106 is lowered in the −Z direction to sense the position of the first surface 112A of the first geometrical feature 12 in the Z direction. If a laser ranging sensor is used as the position sensor 106, the laser ranging sensor may provide an output signal in signal line 106 when a distance (d) between the position sensor 106 and the first surface 112A is less than or equal to a predetermined value (far range value). Accordingly, as the laser ranging sensor is moved in the −Z direction towards the approximate center of the first surface 112A of the first geometrical feature 112, a signal will be provided in line 106B as the predetermined distance (d) is reached at a preset far end range of the laser ranging sensor. Memory resident in the controller 108 may record the Z position coordinate when the signal in signal line 106B is received thereat. Thereafter, the position sensor 106 is moved further in the −Z direction until the laser ranging sensor is turned off (at a near end of the laser's preset range).

Now, the controller 108 may cause the robotic component. 102 and coupled position sensor 106 to move in the −X direction along a path 106X until a first stepped edge of the first geometrical feature 112 on a first side is found, as shown in FIGS. 1B and 1D. Finding the first stepped edge occurs when the signal in signal line 1068 again appears because the distance (d1) to the second surface 112B is now again within the range of the laser ranging sensor when the beam 106A projects off of the edge of first surface 112A and onto the second surface 112B of the teach target 110 at the stepped edge location. Similarly, the controller 108 may cause the robotic component 102 and coupled position sensor 106 to move in the +X direction along path 106X until a second stepped edge on the other side of the first surface 112A of the first geometrical feature 112 is found, as shown in FIGS. 1C and 1D. Finding the second stepped edge occurs when the signal again appears because the distance (d2) is within the preset range of the laser range sensor. Each of these stepped edge location readings may be recorded in memory of the controller 108. The center posit-ion of the first geometrical feature 112 in the X direction may be determined by subtracting half the difference between the first and second stepped edge X readings recorded in memory of the controller 108. This may be repeated again for further accuracy once the first determination is made.

Similar determinations may be made in the Y direction by locating the stepped edges of the first surface 112A in the +Y and −Y directions along the path 106Y, recording the +Y and −Y coordinates in memory, and subtracting half the difference between the +Y and −Y coordinate measurements to obtain a location of the center of the teach target 110 in the Y direction. These readings may be recorded in memory of the controller 108. Once known, the Y determination may be measured again for improved accuracy. Accordingly, the X, Y dimensions of the centerline of the teach target 110, as well as the location of the first surface 112A in the Z direction may be accurately determined.

Now referring to FIG. 1E, the end effector 104 may be moved via a command from the controller 108 such that a centerline 104C of the end effector 104 is moved to be approximately positioned above the nominally known position of the offset tool 114 stationed on the compliant member 132. The end effector 104 is then lowered in an opened condition until the end of the fingers 104A, 104B contact an upper surface (shelf) 114B of the offset tool 114. The end effector 104 is further lowered to slightly compress the compliant member 132 onto which the offset tool 114 rests and is stationed for access. Now the gripper fingers 104A, 104B may be moved inwardly towards each other to grasp the offset tool 114 by the pilot 114A, as is shown in FIG. 1E. In this orientation, the offset tool 114 is precisely positioned relative to the centerline 104C and the tips of the fingers 104A, 104F of the end effector 104 are precisely located relative to the first docking feature 116.

As shown in FIG. 1F, the offset tool 114 is now moved by the end effector 104 via a command from the controller 108 to a nominally known position of the offset target 118. The offset target 118 may be approximately located and centered in the X-Y directions in a cylindrical recess 127 formed in a base 126 of the nesting tool 128. As the docking takes place via moving the end effector 104 in the −Z direction, the interaction of the docking features 116, 120 may cause the slideable offset target 118 to slide and shift in the X and/or Y direction along the surface of the recess 127 and become repositioned at a new location in the recess 127. The offset tool 114 may then be carefully removed along the −Z direction so as to not disturb the location of the offset target 118, and may be returned to its station on the compliant member 132 (See FIG. 1E).

Next, as shown in FIG. 1G, the controller 108 causes the robotic component 102 to move the position sensor 106 to above the nominal position of the offset target 118 in X-Y space. As with the teach target 110, the Z position of the top (first off set) surface 122A in the Z direction may be determined by lowering the position sensor 106 until the far end of the range of the laser range sensor is reached. This Z reading may be recorded in memory in the controller 108. The routine then searches for the respective stepped edges of the second geometrical feature 122 in the X and Y directions in the same manner as described above for the first geometrical feature 112 of the teach target 110. The only difference is that because the second docking feature 120 is included atop the second geometrical feature 122, the searching must commence on the first offset surface 122A at a position offset from the center of second geometrical feature 122. From this, the X and Y center coordinates of the offset target 118 may be readily determined based upon the respective differences between the +X and −X and +Y and −Y readings. These X and Y center values may be stored in memory.

From these X, Y, and Z values determined based upon the readings taken and stored for the teach target 110 and those taken and stored for the offset target 118, an exact positional offset in one or more of the coordinate directions (X, Y, and/or Z) may be determined. In particular, the positional offset between the end effector centerline 104C and the beam 106A of the position sensor 106 in the X and Y directions may be determined. Likewise, a positional offset between the tips of the fingers 104A, 104B and the Z preset ranges measured by the position sensor 106 may be determined. As such, an internal positioning for the robotic component 102 may be nullified at (0, 0, 0) to reflect the offsets such that positioning of the end effector 104 will be true within the reach of the robotic component 102.

Again referring to FIG. 3, the nesting tool 128 may be positioned on the tray 130 at any desired position to obtain the offset position information. For example, the nesting tool 128 is shown positioned at a farthest distance from the robot apparatus zero position on the tray 130. Once the offset information is obtained, the same nesting tool 128 may be repositioned at another location on the tray 130 or on another system component about which it is desired to obtain positional information. It should then be understood that in some embodiments, multiple nesting tools may be employed in the system for determining positional information about the exact location of other system components. For example, FIG. 6 illustrates placing multiple nesting tools 128 onto various locations on the tray 130.

Figure 6:
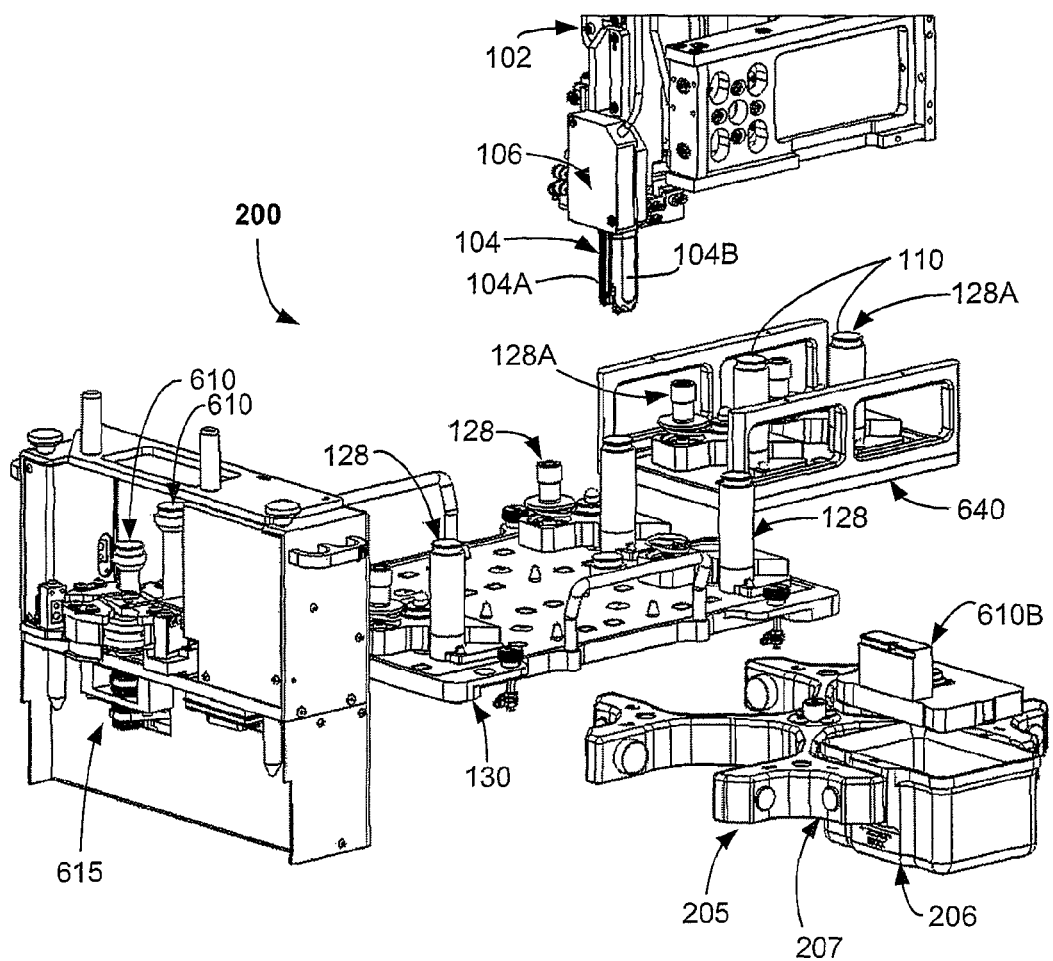
FIG. 6 is a perspective view of an example of a calibration nesting tool installed at multiple locations according to embodiments of the present invention.

As shown in FIG. 6, additional nesting tools 128A may be placed on an inflow/outflow area 640 where cassettes and/or specimen containers, vials, test tubes, etc. may be staged. Optionally, inflow/outflow area 640 may simply be a storage area for the nesting tools 128A to be accessed by the end effector 104. For example, the end effector fingers 104A, 104B may grasp a post of the teach target 110 and transport one or more of the nesting tools 128A to any location in the processing system 200 that is within the reach of the robotic component 102. Additional teach targets 610 may be provided on various other system components for which positional location in X, Y, and/or Z space are desired. For example, teach targets 610 may be provided in a feeder 615. The feeder 615 may be a tool feeder with a rotatable magazine where various tools may be accessed by the end effector 104 as needed. Optionally, the feeder 615 may function to feed specimens into the processing system. Teach targets 610 having different configurations than that of the teach target 110 of the nesting tool 128 may be employed. For example, a teach target 610B may be used to calibrate the location of a bucket 206 mounted in a yolk 207 of a centrifuge apparatus 205 as previously described (only the yolk 207, bucket 206, and teach target 610B shown). The teach target 610B is show elevated above the bucket 206, but is received is close registry in the bottom of the bucket 206 during location calibration.

Figure 7:
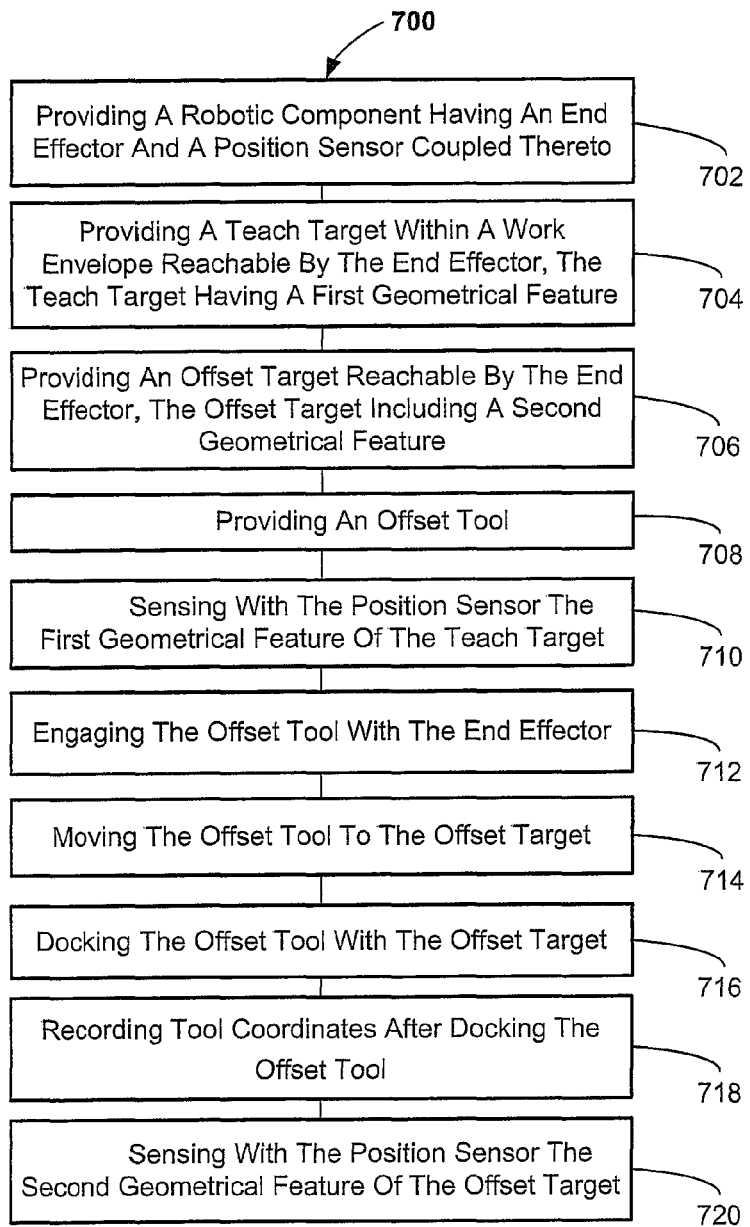
FIG. 7 is a flowchart illustrating a method according to embodiments of the present invention.

The operation of the present invention method of providing an offset between an end effector 104 and a position sensor 106 in a robot offset calibration system 100 will now be described in more detail with reference to FIG. 7. The method 700 includes, in 702, providing a robotic component having an end effector and a position sensor coupled thereto, and providing in 704 a teach target (e.g., 110) within a work envelope reachable by the end effector (e.g., 104), the teach target having a first geometrical feature (e.g., 112). The method 700 further includes, in 706, providing an offset target (e.g., 118) reachable by the end effector, the offset target including a second geometrical feature (e.g., 122); providing an offset tool (e.g., 114) in 708; and sensing with the position sensor (e.g., 106) the first geometrical feature of the teach target in 710. The method 700 further includes engaging the offset tool (e.g., 114) with the end effector (e.g., 104) in 712; moving the offset tool (e.g., 114) to the offset target (e.g., 118) in 714; and docking the offset tool (e.g., 114) with the offset target (e.g., 118) in 716. The method 700 may then record the tool coordinates after docking the offset tool (e.g., 118) in 718; and sense with the position sensor (e.g., 106) the second geometrical feature (e.g., 122) of the offset target (e.g., 118) in 720.

While the invention is susceptible to various modifications and alternative forms, specific system and apparatus embodiments and methods thereof have been shown by way of example in the drawings and are described in detail herein. It should be understood, however, that it is not intended to limit the invention to the particular systems, apparatus, or methods disclosed but, to the contrary, the intention is to cover all modifications, equivalents, and alternatives falling within the spirit and scope of the invention.

What is claimed is:

1. A method of providing a positional offset, comprising:
   providing a robotic component having an end effector and a position sensor coupled thereto;
   providing a teach target within a work envelope reachable by the end effector, the teach target having a first geometrical feature;
   providing an offset target reachable by the end effector, the offset target including a second geometrical feature;
   providing an offset tool;
   sensing with the position sensor the first geometrical feature of the teach target;
   engaging the offset tool with the end effector;
   moving the offset tool to the offset target;
   docking the offset tool with the offset target;
   recording tool coordinates after docking the offset tool;
   sensing with the position sensor the second geometrical feature of the offset target; and
   determining an offset between the position sensor and the end effector based upon the one or more coordinates of each of the first geometrical feature and the second geometrical feature.

2. The method of claim 1, further comprising recording one or more coordinates of the first geometrical feature sensed by the position sensor.

3. The method of claim 1, further comprising recording one or more coordinates of the second geometrical feature sensed by the position sensor.

4. The method of claim 1, further comprising gripping the offset tool with gripper fingers of the end effector.

5. The method of claim 1, wherein docking moves a location of the offset target in one or more directions.

6. The method of claim 1, wherein engaging the offset tool with the end effector involves compressing a compliant member on which the offset tool rests.

7. The method of claim 1, further comprising mounting the teach target, the offset tool, and the offset target onto a common base.

8. The method of claim 1, further comprising sensing another teach target with the position sensor at another location within the reach of the robotic component.

* * * * *